Dec. 7, 1926.
J. E. MORCE
1,609,627
ACTUATING MECHANISM
Filed August 6, 1925
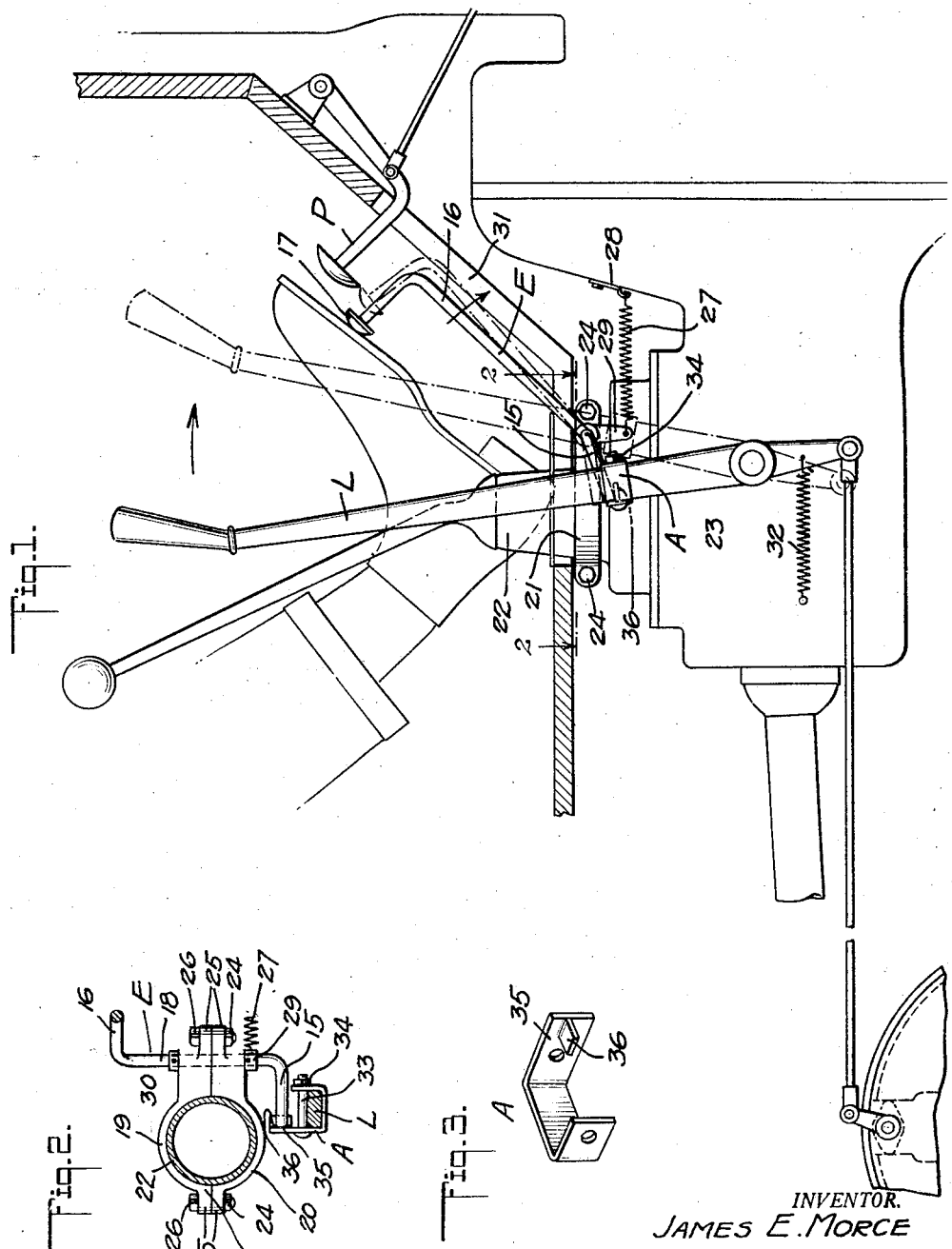
INVENTOR.
JAMES E. MORCE
BY Munn & Co.
ATTORNEYS.

Patented Dec. 7, 1926.

1,609,627

UNITED STATES PATENT OFFICE.

JAMES E. MORCE, OF SOUTH PASADENA, CALIFORNIA.

ACTUATING MECHANISM.

Application filed August 6, 1925. Serial No. 48,632.

My invention relates broadly to actuating mechanisms, and has for a general object the provision of a new and novel arrangement of actuators that can be successively controlled automatically and connected with instrumentalities of a motor vehicle to likewise govern successive operations thereof to the end that said instrumentalities may function in an intended sequence and without disastrous results.

One object of my invention is the provision of a simple, substantial and positive brake releasing device which is particularly adapted, although not necessarily, for effecting the release of the hand brake lever of the vehicle from its braking position, the device being arranged in such manner that the movement of the foot to depress the accelerator pedal will operate to release the brake lever prior to an actual depression of the pedal and thereby prevent stalling of the engine which would otherwise occur if an attempt were made to start the vehicle with its brake applied, whereby damage to the engine and running gear, as well as the danger of stalling in a precarious position on the road will be obviated.

Another object of my invention is the provision of a device of the above described character which operates automatically to latch the brake lever in braking position and which is constructed in the form of an attachment capable of being readily applied to existing vehicles.

I will describe only one form of actuating mechanism embodying my invention and will then point out the novel features thereof in claims.

In the accompanying drawings.

Figure 1 is a view showing in side elevation one form of actuating mechanism embodying my invention in applied position to a motor vehicle;

Figure 2 is a horizontal sectional view taken on the line 2—2 of Figure 1; and

Figure 3 is a perspective view of an abutment member comprised in the device to which the actuating mechanism is shown applied.

Referring specifically to the drawings, in which similar reference characters designate similar parts in each of the several views, one embodiment of my invention is illustrated which comprises a brake latching and releasing element E which in the present instance is shown in the form of a metal rod bent to provide a brake latching lever 15 and a relatively long L-shaped brake releasing lever 16 having a head 17 adapted to be engaged by the foot, the two arms extending oppositely in different parallel planes and connected by a straight transverse portion to provide a rock shaft 18. The shaft 18 is adapted to be extended through openings formed in the sections 19 and 20 of a bracket 21 before one of the levers 15 and 16 is bent, and the bracket is adapted to be clamped to the gear lever post 22 of the conventional gear transmission 23 by means of bolts 24 extending through perforated ears 25 formed on the section, the bolts having nuts 26. By means of the bracket 21, the element E is supported for movement about the axis of the shaft 18 and is normally urged to the position shown in full lines in Figure 1, which I term the brake latching position, by means of an expansible spring 27 attached at one end to a clip 28 secured to the transmission housing and at its opposite end to an arm 29 fixed to the shaft 18, the arm 29 also cooperating with a collar 30 fixed to the shaft 18 to prevent longitudinal movement of the latter upon the bracket 21. The arm 16 of the element E extends through a slot 31 in the floor boards of the driving compartment with its head 17 arranged adjacent an accelerator pedal P, so as to be disposed in the path of movement of the foot when the latter is positioned to depress the pedal, and when the element is in its normal position the head 17 projects beyond the plane of the pedal a sufficient distance to permit its movement by the foot to the brake releasing position shown in dotted lines, without actuating the pedal.

With the element E occupying its normal position, its latching lever 15 is disposed in the path of movement of an abutment member A adapted to be secured to a pivoted brake lever L which is connected in any desired manner to a conventional form of brake and is normally urged to released position shown in dotted lines by means of an expansible spring 32, as will be understood. The abutment member A in the present instance is shown in the form of a U-shaped strap which is secured to the brake lever by means of a bolt 33 extending through registering openings formed in the arms of the strap, and having a nut 34. One of the arms is extended as shown at 35 and is provided with a lug 36, the lug and extended portion of the arm positioned so as to be engaged by the latching lever 15 when the brake lever L is manually moved to braking position as shown in full lines, and thus maintain the lever against retrograde movement under the action of its spring 32.

In operation, and with the brake lever occupying the released position shown in dotted lines, it will be clear that the latch lever 15 rests upon the extended arm of the abutment A under the action of the spring 27 and that when the brake lever is moved to occupy the braking position, the end of the latch lever engages behind the extended arm and rests upon the lug 35, thus latching the brake lever in braking position to prevent movement of the vehicle. During the operation of starting the vehicle and with the foot of the operator moving to depress the accelerator pedal P, it will be clear that the foot will first engage the head 17 of the releasing lever 16 and that upon continued movement of the foot the latch lever 15 will be disengaged from the abutment A to effect the release of the brake lever L in advance of the actual depression of the pedal, so that when the pedal is finally depressed to admit fuel to the motor and start the vehicle, the brakes will be released and the danger of stalling the motor positively prevented.

Although I have herein shown and described only one form of actuating mechanism embodying my invention, it is to be understood that various changes and modifications may be made therein without departing from the spirit of the invention and the spirit and scope of the appended claims.

I claim as my invention:

1. Mechanism of the character described comprising a bracket adapted to be secured to a support, a latch lever movably mounted on the bracket and normally urged to brake latching position, an abutment adapted to be secured to a brake lever so as to be engaged by said latch lever when the brake lever is in braking position, and foot-actuated means operatively connected to said latch lever and associated with an accelerator pedal in such manner that movement of a foot to depress the pedal will cause said last means to be actuated to disengage said latch lever from said abutment prior to the actual depression of the pedal whereby the brake lever will be free to move to non-braking position.

2. Mechanism of the class described comprising a bracket adapted to be secured to a support, a latch lever movably mounted on the bracket and normally urged to brake latching position, an abutment adapted to be secured to a brake lever so as to be engaged by said latch lever when the brake lever is in braking position, and a lever operatively connected to said latch lever and having a portion adapted to be engaged by the foot, said portion associated with an accelerator pedal and arranged in the path of movement of the foot when positioned to depress the pedal so as to be moved by the foot prior to the actual depression of the pedal and thereby cause said latch lever to be disengaged from said abutment to effect the release of the brake lever.

3. Mechanism of the class described comprising a bracket adapted to be secured to a support, a latch lever movably mounted on the bracket and normally urged to brake latching position, an abutment adapted to be secured to a brake lever so as to be engaged by said latch lever when the brake lever is in braking position, a latch lever pivotally mounted on the bracket and normally urged to a latching position, an abutment comprising a U-shaped member adapted to be secured to a brake lever in a manner to be engaged by said latch lever when the brake lever is in braking position, a lug on the member for preventing the movement of the latch lever toward its urged position when the brake lever is in braking position, and foot actuated means comprising a lever connected to said latch lever and having an angularly disposed extension associated with an accelerator pedal in such manner that movement of a foot to depress the pedal will cause said last means to be actuated to disengage said latch lever from said abutment prior to the actual depression of the pedal whereby the brake lever will be free to move to non-braking position.

4. A brake releasing device comprising a bracket adapted to be secured to a support, a rock shaft mounted on the bracket, a latch lever on one end of the shaft, an actuating lever on the opposite end of the shaft having an angularly disposed extension adapted to be engaged by the foot, means for preventing longitudinal movement of the shaft on the bracket, an abutment comprising a U-shaped member adapted to be secured to a brake lever and having a lug adapted to be engaged by the latch lever when the brake lever is in braking position, an arm fixed to the shaft, and an expansible spring secured at one end to the shaft and adapted to be secured at the opposite end to a support so as to urge said latch lever towards latching position.

5. In a motor vehicle, a brake lever normally urged to a non-braking position, an accelerator pedal, means for latching the lever in braking position, and means arranged in the path of movement of the foot when positioned to depress the pedal for releasing the brake lever prior to the depression of the pedal, and thereby permit the brake lever to return to non-braking position, whereby stalling of the motor of the vehicle when starting the vehicle will be prevented.

6. In a motor vehicle, a brake lever normally urged to a non-braking position, an accelerator pedal, means for latching the lever in braking position, comprising an abutment secured to the brake lever and a latch lever adapted to engage the abutment when the brake lever is in braking position, and means for releasing the brake lever comprising a lever operatively connected to the latch lever and having a portion thereof associated with the accelerator pedal in such manner that movement of the foot to depress the pedal will cause said lever to be moved prior to the depression of the pedal and thereby release said brake lever before the pedal is depressed for the purpose described.

7. A brake releasing device comprising means for latching a brake lever in braking position, and brake releasing means operatively connected to said first means and associated with an accelerator pedal in such manner that the foot of an operator moving to depress the pedal will actuate said last means to effect the release of the brake lever in advance of the actual depression of the pedal.

8. A brake releasing device comprising a latching member normally urged to one extreme position wherein it is adapted to latch a brake lever against movement when the lever is in a braking position and movable to a second extreme position to release the brake lever, and a foot actuated member operatively connected to said latching member and associated with an accelerator pedal in such manner that the foot of an operator moving to depress the pedal will actuate the last said member to release the brake lever in advance of the actual depression of the pedal.

9. A brake releasing device comprising means for latching a brake lever in braking position and brake releasing means operatively connected to said first means and having a portion disposed adjacent to and projecting above the plane of an accelerator pedal, said portion adapted to be actuated by the foot of an operator moving to depress the pedal and thereby actuate said first means to effect the release of the brake lever in advance of a depression of the pedal.

JAMES E. MORCE.